United States Patent Office 2,766,141
Patented Oct. 9, 1956

2,766,141

ZIRCONIUM BORIDE BODY IMPREGNATED WITH MOLYBDENUM SILICIDE AND METHOD OF MAKING SAME

Kenneth C. Nicholson, Niagara Falls, N. Y., assignor to The Carborundum Company, Niagara Falls, N. Y., a corporation of Delaware No Drawing. Application October 19, 1951,
Serial No. 252,199

14 Claims. (Cl. 117—123)

This invention relates to novel refractory compositions and to articles and shapes made therefrom. It also pertains to methods for making said compositions and articles.

There is a strong demand at the present time for new and better refractory compositions and shapes which will stand up under the ever increasing and exacting demands required of them in respect of strength, hardness, density, resistance to oxidation and other forms of corrosion and erosion, resistance to thermal shock and other conditions bringing about deterioration and failure of more conventional refractory bodies.

It is an object of the present invention to provide new refractory compositions having highly satisfactory properties in many of the above respects and offering many advantages in various fields of use where a material or body of marked refractory properties and characteristics of hardness and density are required.

According to the present invention, I have found that a bonded refractory body composed of zirconium boride with or without an additional bonding material can be improved in many respects by impregnating the zirconium boride body with molybdenum silicide. The bonded zirconium boride refractory body or shape which is to be impregnated with molybdenum silicide can be one consisting essentially of self-bonded zirconium boride or it can be one composed of zirconium boride together with a suitable refractory bonding material such as, for example, the zirconium boride bodies disclosed in my copending U. S. patent application Serial No. 237,284, filed July 17, 1951, and issued February 23, 1954, as U. S. Patent No. 2,670,301. The bonded zirconium bodies of that application can be described briefly as consisting essentially of zirconium boride which is bonded or held together in a surrounding interstitial matrix comprising oxidation compounds of zirconium and calcium. The zirconium boride which is used in making the compositions of the present invention can be obtained either by using zirconium boride which has been previously prepared by various of the prior art methods for making that material or preferably it can be a zirconium boride previously prepared in accordance with the teachings of my co-pending application filed of even date herewith. In making the zirconium boride-containing bodies in which the zirconium boride is bonded by compounds of zirconium and calcium in oxidized form the zirconium boride can be previously formed from suitable raw materials or the zirconium boride can be formed in the course of impregnation of the zirconium boride with molybdenum silicide according to the herein described process.

The zirconium boride after it has been molded to form an article of the desired shape, and preferably after it has been fired, is impregnated with molybdenum silicide by placing the bonded zirconium boride shape together with the required amount of molybdenum silicide or components of molybdenum silicide in a furnace and heating the boride body and the silicide to a temperature of over 1800° C. in an inert atmosphere or in vacuum while it is in contact with the impregnating material. The molybdenum silicide which is used to impregnate the bonded zirconium boride shape is used in the form of a powdered molybdenum silicide or in the form of a mixture of molybdenum and silicon metal in powdered form in the stoichiometric proportions required by the formula $MoSi_2$. In other words, molybdenum silicide impregnation can be obtained by using in place of molybdenum silicide as the impregnating material a powdered mixture of about 63% molybdenum metal and about 37% silicon metal.

The following specific examples illustrate more clearly the exact manner in which the present invention can be carried out, although the invention is not to be construed as being limited to the particular proportions set forth in the examples. The percentages given, unless otherwise specified, are percentages by weight.

*Example 1*

| | Percent |
|---|---|
| Calcium boride ($CaB_6$) 200 mesh and finer | 24.2 |
| Zirconium oxide (325 mesh) | 69.3 |
| Powdered carbon | 6.5 |

The above mixture was placed in a covered zirconia crucible which was bedded in zirconia grog in a graphite boat which in turn was placed in a carbon tube resistance furnace. The crucible was of slip cast stabilized zirconia previously fired to 1700° C. After the furnace was loaded the temperature was raised to 2010° C. over a period of two hours, a stream of helium gas being continually passed through the furnace throughout the entire firing period.

The composition resulting was then crushed to the desired degree of fineness whereupon it was used to mold articles of the desired shape. The resulting articles were fired at a temperature of 2000–2100° C. in an atmosphere of helium or other inert gas to provide finished shapes of highly refractory character, such as crucibles, nozzles, rocket lining segments and inserts, and the like. For example, a small nozzle approximately 1" in diameter and 1¼" in length and having a wall thickness of approximately ³⁄₁₆" at the ends tapering to a wall thickness at the throat of ⁵⁄₁₆" was made by grinding the above-described material to under 200 mesh particle size in an iron mortar and the resulting crushed material mixed with 2% of a 33% water solution of "Carbowax" No. 4000. "Carbowax" No. 4000 is the trade mark for a polyethylene glycol composition made by Carbide and Carbon Chemicals Corp., 30 E. 42nd Street, New York 17, New York. The resulting mixture was pressed to shape at 10,000 pounds per square inch pressure and the molded article embedded in zirconia grog in a graphite boat and fired to 1820° C. in an atmosphere of helium in a high frequency electrical induction furnace.

The resulting nozzle consists of bonded zirconium boride in which the crystalline zirconium boride is held together in a matrix comprising a solid solution of calcium oxide in zirconium oxide. The bonded zirconium boride nozzle was bedded in zirconia grog in a graphite boat which was placed in the center of a carbon tube resistance furnace and a mass equal to approximately 30% by weight of the nozzle of 170 mesh size molybdenum silicide ($MoSi_2$) placed upon and within the center of the nozzle. The entire assembly of nozzle and molybdenum silicide material was then heated to 1820° C. in an atmosphere of helium whereupon the molybdenum silicide melted and diffused into the body of the nozzle to impregnate the entire mass of the nozzle with molybdenum silicide. The resulting nozzle was strong, hard and upon fracture displayed internally a silvery and metallic appearance.

The calcium boride used in making the original mix of Example I was a material obtained from the Electro Metallurgical Company of Niagara Falls, New York, and had the following chemical analysis:

| | Percent |
|---|---|
| Calcium | 27.25 |
| Boron | 38.62 |
| Silicon | .44 |
| Aluminum | .50 |
| Iron | .52 |
| Magnesium | .23 |
| Total carbon | 14.61 |

17% of the calcium boride material was unaccounted for by analysis; this percentage was presumed to be oxygen contained in the material.

*Example II*

Satisfactory bonded zirconium boride nozzles impregnated with molybdenum silicide in accordance with the present invention have also been made as follows:

| | Parts by weight |
|---|---|
| Zirconium boride, 100 mesh and finer | 75 |
| Calcium zirconate, 200 mesh and finer | 25 |
| Dextrine | 1 |

The calcium zirconate was first made by heating together a mixture of 44.7% by weight calcium carbonate and 55.3% by weight of zirconium oxide to a temperature of about 1800° C. The resulting sintered product was then crushed to pass through a 200 mesh sieve.

The aforesaid mixture of zirconium boride and calcium zirconate together with the temporary binder was moistened with sufficient water to give a moldable mixture which was then pressed in a steel mold at a pressure of 20,000 pounds per square inch. The pressed nozzle was dried at around 250° F. and fired to a temperature of 2000° C. in an inert atmosphere, for example, in a stream of helium, in an Ajax high frequency induction furnace. The article was supported in the furnace on a stabilized zirconia batt. The resulting nozzle at this stage of the process consisted essentially of zirconium boride bonded by calcium zirconate. This nozzle was again placed in the Ajax high frequency induction furnace supported on a stabilized zirconia batt and a mass of molybdenum and silicon metal powders crushed to a fineness of 200 mesh and finer was placed in the throat of the nozzle. The molybdenum and silicon were in the proportion of 63% by weight molybdenum metal and 37% by weight silicon metal. The crucible containing the nozzle and impregnating metal powders were again heated to a temperature of 1800° C. in an atmosphere of helium whereupon the metal powders melted and formed molybdenum silicide which penetrated the pores of the bonded zirconium boride nozzle. The final product consisted essentially of the zirconium boride bonded by calcium zirconate with the pores of the bonded body containing molybdenum silicide.

Small test bars made in accordance with the procedure set forth in Example II above were subjected to heat shock tests in which the bars were placed in a furnace and heated to a temperature of 1100° C. and then removed and air-quenched. Such test bars stood up under one hundred cycles of the test without change, thereby showing that the resulting molybdenum-impregnated, bonded zirconium boride bodies were exceptionally resistant to heat shock.

Bars of the material subjected to a modulus of rupture test were found to have strengths of around 22,000 pounds per square inch at room temperature.

*Example III*

Nozzles and other small shapes composed essentially of self-bonded zirconium boride impregnated with molybdenum silicide have been made as follows:

Zirconium boride in 200 mesh particle size was mixed with approximately 2% by weight of a 33% solution of "Carbowax" No. 4000 and the mixture pressed to the desired shape at around 10,000 pounds per square inch. The resulting shape was bedded in zirconia grog and placed in a graphite boat and fired in a carbon tube resistance furnace to a temperature of 1800–2000° C. in an atmosphere of helium to form a self-bonded zirconium boride body. The furnace was then cooled and the resulting bonded zirconium boride body again placed in a furnace together with or in contact with a supply of powdered molybdenum silicide and the two heated to a temperature of 1800° C. in an atmosphere of helium to melt the molybdenum silicide and impregnate the bonded body with the silicide.

In the above examples the bonded zirconium boride body has been fired and the step of impregnating the body with molybdenum silicide has been carried out as separate sequent operations. However, in each of the above examples the step of impregnating the bonded zirconium boride body with molybdenum silicide can be carried out simultaneously with the firing of the zirconium boride shapes.

Articles made in accordance with the present invention may be molded by any of the well-known methods including pressure molding, machine tamping, hand tamping, jolting, vibrational tamping, air hammer flat or edge tamping, or slip casting.

It is to be understood that the products of the present invention in its various modifications are not limited to any specific field or fields of use such as might be defined by the specific examples previously set forth. The products can be made in any desired shape as well as provided in granular or aggregate form. They are, therefore, not only suited for many of the uses for which industrial refractories are required, including bricks, blocks, setter tile, muffles, kiln furniture, and special shapes for application in and around furnaces and other high temperature equipment, but they are also well suited for many specially high temperature applications, such as jet engine combustion chambers, linings for exhaust nozzles, rocket combustion chambers and exhaust nozzles, turbine blades, stator blades, lens fusion blocks, and the like. They are also suitable for the fabrication of laboratory ware, including combustion boats, crucibles, burner holders, and other shapes.

The resistance of such bodies to chemical attack makes them highly suitable for the making of articles used in the containing, conveying and handling of many acids, alkalies and other corrosive chemicals, including such articles as chamber linings, crucibles, pipes and pipe fittings, jet pump linings, and other sundry shapes.

Materials and articles of the present invention also can be made for abrasive purposes such as grinding wheels, sharpening stones, razor hones, and other grinding and polishing shapes and materials. Other miscellaneous uses include their use as thread guides, wire drawing dies, sand blasting nozzles, heating elements, and the like. For example, electrical heating elements in rod form have been made in accordance with the present invention, which have operated at 1400° C. to provide a source of radiant heat.

Having thus described the invention it is desired to claim:

1. A refractory body consisting predominantly of zirconium boride and containing interstitial molybdenum silicide.

2. A dense, self-bonded zirconium boride body consisting essentially of zirconium boride and impregnated with molybdenum silicide.

3. A refractory body comprising zirconium, boron, calcium, molybdenum and silicon, a predominant portion of the zirconium and boron being in the form of crystalline zirconium boride, and the molybdenum and silicon being present as interstitial molybdenum silicide.

4. A bonded refractory body comprising zirconium boride and a bond of oxidized zirconium and calcium, said body being impregnated with molybdenum silicide.

5. A refractory article composed of zirconium boride and a calcium zirconate bond together with interstitial molybdenum silicide.

6. A refractory article comprising zirconium boride held together in a matrix containing zirconia and calcium oxide in solid solution, said article further containing a substantial amount of interstitial molybdenum silicide.

7. A refractory shape comprising zirconium boride held together in an interstitial mass of zirconium oxide containing calcium oxide in solid solution, and further containing a substantial amount of molybdenum silicide dispersed throughout the body of the article.

8. A refractory body composed of crystalline zirconium boride in an interstitial mass of calcium zirconate, said body also containing molybdenum silicide.

9. A refractory body composed of roughly 3 parts of zirconium boride to 1 part of calcium zirconate, said body also containing a substantial amount of molybdenum silicide.

10. A method of making bonded zirconium boride bodies impregnated with molybdenum silicide which comprises forming a mixture comprising granular zirconium boride and finely divided calcium zirconate, molding an article of the desired shape from said mixture, and firing the molded article to a temperature of about 2000° C. in an inert atmosphere, and subsequently firing the molded article in contact with molybdenum silicide in an inert atmosphere to impregnate the article with molybdenum silicide.

11. A method of making bonded zirconium boride bodies impregnated with molybdenum silicide which comprises forming a mixture comprising calcium boride, zirconium oxide and carbon, firing said mixture in an inert atmosphere to a temperature of about 2000° C., crushing the resulting material and molding an article of the desired shape from said material, firing the molded article to a temperature of about 2000° C. in an inert atmosphere, and further firing the article in contact with molybdenum silicide in an inert atmosphere to a temperature of around 1800° C. to impregnate the article with molybdenum silicide.

12. A method of making a dense zirconium boride article which comprises molding an article of the desired shape from zirconium boride, placing the article in contact with molybdenum silicide and firing the article and molybdenum silicide to a temperature of above 1800° C. in an inert atmosphere to mature the article and impregnate it with molybdenum silicide.

13. A method of making bonded zirconium boride bodies impregnated with molybdenum silicide which comprises molding an article of the desired shape from a mixture consisting essentially and predominantly of zirconium boride and firing said article in contact with molybdenum silicide to a temperature of above 1800° C. in an inert atmosphere to impregnate it with molybdenum silicide.

14. A method of making bonded zirconium boride bodies impregnated with molybdenum silicide which comprises forming an article of the desired shape from a particulate mass of material which is to constitute the zirconium boride of the body and any body therefor, and firing said article in the presence of molybdenum silicide to a temperature of at least 1800° C. in an inert atmosphere.

References Cited in the file of this patent

UNITED STATES PATENTS

| | | |
|---|---|---|
| 1,356,211 | Linbarger | Oct. 19, 1920 |
| 1,502,501 | Gumowski | July 22, 1924 |
| 1,989,736 | Boyles | Feb. 5, 1935 |
| 1,996,220 | Tigerschiold et al. | Apr. 2, 1935 |
| 2,237,478 | Cooley | Apr. 8, 1941 |
| 2,406,275 | Wejnarth | Aug. 20, 1946 |
| 2,524,739 | Stone | Oct. 3, 1950 |

UNITED STATES PATENT OFFICE
CERTIFICATE OF CORRECTION

Patent No. 2,766,141 October 9, 195

Kenneth C. Nicholson

It is hereby certified that error appears in the printed specification of the above numbered patent requiring correction and that the said Letters Patent should read as corrected below.

Column 6, line 23, for "body", second occurrence, read -- bond --.

Signed and sealed this 15th day of July 1958.

(SEAL)

Attest:
KARL H. AXLINE
Attesting Officer

ROBERT C. WATSON
Commissioner of Patents